Patented May 24, 1938

2,118,089

UNITED STATES PATENT OFFICE 2,118,089

SULPHATED POLYETHENOXY-ALKYL-ARYLAMINES

Arthur Howard Knight and Henry Alfred Piggott, Blackley, Manchester, England, assignors to Imperial Chemical Industries Limited, a corporation of Great Britain No Drawing. Application February 21, 1935, Serial No. 7,660. In Great Britain February 23, 1934

8 Claims. (Cl. 260—99.12)

In co-pending application Serial No. 7,661, filed February 21, 1935 of even date, there is described the manufacture of new polyethenoxy derivatives of arylamines of the benzene or naphthalene series.

According to the present invention we make further new dyestuff intermediates namely sulphato derivatives of polyethenoxyarylamines by treating them with sulphating agents, i. e. agents capable of converting the —CH$_2$OH group into the —CH$_2$OSO$_3$H group or into a water-soluble salt thereof.

Examples of sulphating agents which may be used for the said conversion are concentrated sulphuric acid, fuming sulphuric acid, chlorosulphonic acid (alone or in the presence of a tertiary amine), and sodium pyrosulphate in the presence of a tertiary amine.

When the hydroxyethoxyalkylamine contains more than one hydroxyethoxyalkyl group or a hydroxyethoxyalkyl group and a hydroxyalkyl group, sulphato compounds containing a plurality of —CH$_2$OSO$_3$H groups can be made.

The new dyestuff intermediates are valuable for the production of water-soluble azo dyes, and are conveniently used for such purposes in the form of aqueous solutions of their salts, without previous isolation.

The following examples illustrate but do not limit the invention, parts being by weight.

Example 1.—28.1 parts of the product obtained by condensing 193 parts of N-n-butyl-m-amino-p-cresol methyl ether with 88 parts (two equivalents) of ethylene oxide, according to the process of co-pending application Serial No. 7,661, filed February 21, 1935, are dissolved in 64 parts of tetrachloroethane. The solution is cooled in ice water and 11.7 parts of chlorosulphonic acid are added during a quarter of an hour with good agitation. The mixture is stirred at room temperature for several hours and then raised to 95° C. and kept at this temperature for 2 hours. The tetrachloroethane is then removed and the remaining product is then cooled, 100 parts of water added, and sufficient 2N caustic soda to make the mixture alkaline.

Example 2.—25.3 parts of the product obtained by condensing 121 parts of N-ethylaniline with 132 parts (three equivalents) of ethylene oxide are dissolved in 64 parts of tetrachloroethane and the solution so obtained cooled to 0–5° C. 11.6 parts of chlorosulphonic acid are then added to this solution during half an hour with good agitation. After stirring the mixture so obtained for several hours at room temperature it is heated to 90° C. and kept at that temperature for 2–3 hours. The solvent is then removed by distillation under reduced pressure leaving the desired sulphated product as a pale yellowish-brown viscous oil. For use in azo dyestuff preparations it is conveniently preserved as a solution in dilute aqueous caustic soda.

Our new products in the form of their sodium salts may be represented by the following formula:

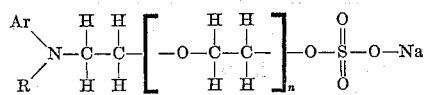

where Ar stands for an aryl group of the benzene or naphthalene series, R stands for alkyl or hydroxyalkyl or for the group

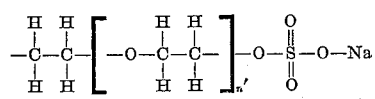

and $n$ and $n'$ are integers greater than zero. The most valuable of the new products are those in which the sum of $n$ and $n'$ does not exceed 4.

Polyethenoxy-derivatives of the most varied arylamines of the benzene or naphthalene series such as are described in our application No. 7,661, filed February 21, 1935 of even date may be successfully converted into sulphato compounds by the process herein described.

The polyethenoxy derivatives described in application, Serial No. 7,661 may be made by combining a primary hydroxyethyl-aryl-amine or hydroxy-ethyl-alkyl-aryl-amine of the benzene or naphthalene series with ethylene oxide under pressure and preferably in the presence of an alkaline condensing agent, such as sodium hydroxide, until at least two equivalents of ethylene oxide are combined and a compound represented by the following formula is produced

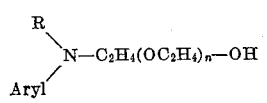

in which aryl is the radical of a benzene or naphthalene compound, R is alkyl, hydroxy alkyl or the group —C$_2$H$_4$(OC$_2$H$_4$)$_{n'}$—OH and $n$ and $n'$ are integers. A large number of the most valuable of these products are those in which $n$ or the sum of $n$ and $n'$ does not exceed 4.

We claim:

1. A dyestuff intermediate being a sulphato compound having in the form of its sodium salt the formula

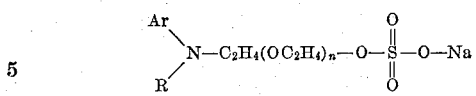

in which Ar stands for an aryl residue from the group consisting of nuclei of the benzene and naphthalene series and R stands for a member of the group consisting of alkyl and the radical represented by the formula

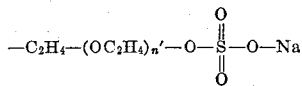

in which $n$ and $n'$ are integers having values of at least two and not greater than three.

2. The dyestuff intermediates being sulphato compounds having in the form of their sodium salts the formula

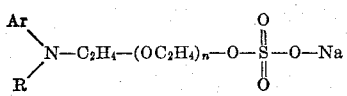

where Ar stands for aryl from the group consisting of benzene and naphthalene, R stands for one of a group consisting of alkyl, hydroxyalkyl, and the radical

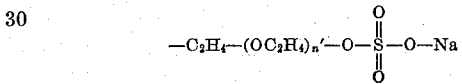

and $n$ and $n'$ are integers having values of at least two and not greater than three.

3. The dyestuff intermediates being sulphato compounds as claimed in claim 2, in which the sum of $n$ and $n'$ does not exceed four.

4. A dyestuff intermediate being the sulphato compound as claimed in claim 2, in which Ar stands for the radical

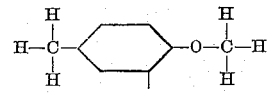

and R stands for n-butyl.

5. A dyestuff intermediate being the sulphato compound as claimed in claim 2, in which Ar stands for phenyl and R stands for ethyl.

6. A dyestuff intermediate being a sulphato compound represented in the form of its sodium salt by the formula

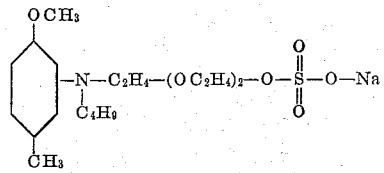

7. Process for the manufacture of new dyestuff intermediates which comprises treating a polyethenoxy derivative of an alkylarylamine, in which aryl is one of a group consisting of the benzene and naphthalene series with a sulphating agent.

8. Process for the manufacture of new dyestuff intermediates which comprises treating the crude reaction mixture, obtained in the manufacture of polyethenoxy derivatives from an alkylarylamine, in which aryl is one of a group consisting of the benzene and naphthalene series and a plurality of molecular proportions of ethylene oxide, without isolation with a sulphating agent.

ARTHUR HOWARD KNIGHT.
HENRY ALFRED PIGGOTT.